Figure 1:
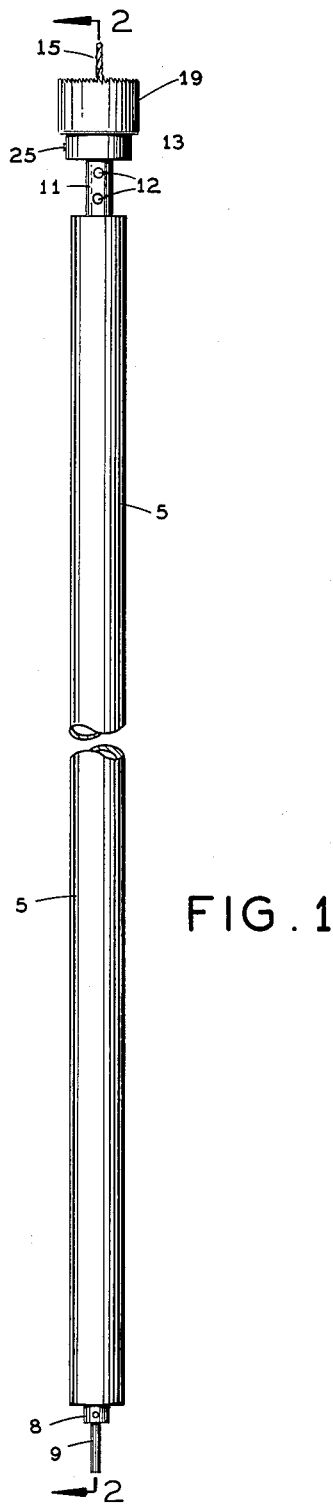

June 23, 1964

W. S. STEWART 3,138,183

ROTARY SAW CONTROL MEANS

Filed Sept. 4, 1962

INVENTOR.
WILLIAM S. STEWART
BY
ATTORNEY

United States Patent Office 3,138,183
Patented June 23, 1964

3,138,183
ROTARY SAW CONTROL MEANS
William S. Stewart, 313 27th St. W., Bradenton, Fla.
Filed Sept. 4, 1962, Ser. No. 221,212
1 Claim. (Cl. 145—120)

This invention relates to a boring device and has for its prime purpose the boring of holes through a roof structure and closely adjacent to the side of a building for the installation of electrical conduits.

The invention contemplates a rotary saw and a pilot drill, a drive shaft for the saw and the drill to be driven by a conventional hand drill and with the shaft being supported in an elongated non-rotatable housing whereby the device may be manually held and guided to the point where the hole is to be bored.

In certain localities, the local ordinances require that a conduit for homes and other buildings be brought downwardly through an opening through the roof to lie against the wall and to be coupled to any conventional inlet fittings for the building. It has been extremely difficult to bore the holes upwardly through the roof structure and especially that type of roof structure having an overhanging eaves and with the roof structure in many cases being of a pitched type thus forming a space between the pitched roof and the eaves and it has been extremely difficult to drill the opening upwardly through the eaves boards, to pass through the spacing between the eaves and the roof and to properly form an aligned opening in the roof structure. The device of this invention greatly facilitates the boring of the holes since the tubular housing may be held closely adjacent to the side of the building and the pilot drill first entering the boards and the operator and the housing being vertically disposed by the use of a spirit level and then when properly positioned, a hand drill is connected to the lower end, starting the hole by the pilot drill and feeding the saw upwardly through both the eaves and the roof.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
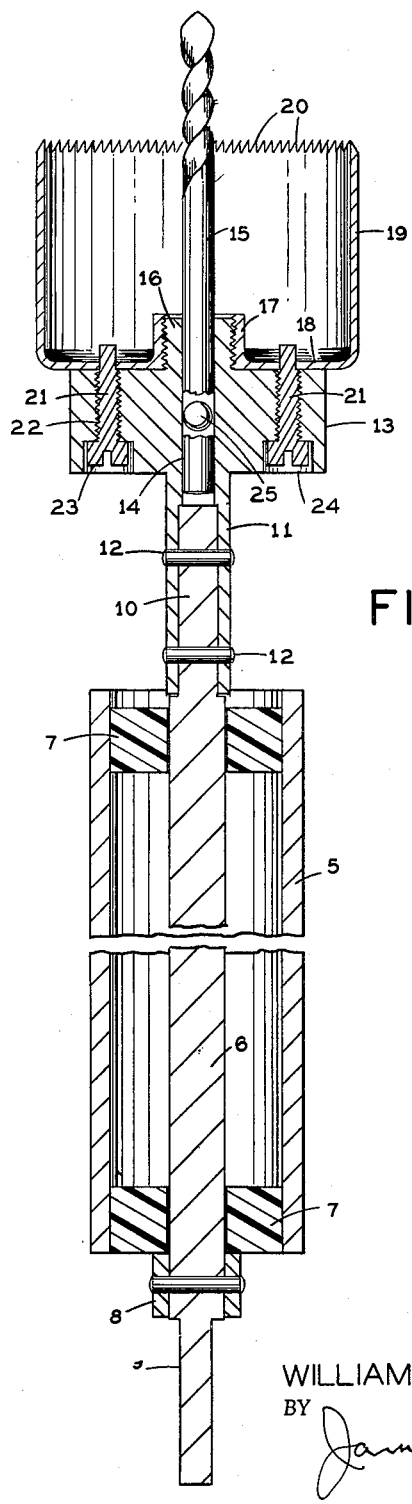

In the drawings:

FIGURE 1 is a side elevation of a boring tool constructed in accordance with the invention, and FIGURE 2 is an enlarged vertical section taken on line 2—2 of FIGURE 1.

Referring specifically to the drawings, there has been provided an elongated tubular housing 5, open at its opposite ends. Passing axially through the housing 5 is a shaft 6. The shaft 6 has rotative engagement with non-metallic bushings 7 at the upper and lower ends of the housing 5. The bushing 7 may be formed of fiber or plastic and are press fitted into the opposite ends of the housing. The shaft 6 projects downwardly below the lower bushing 7 to receive a stop collar 8 and the shaft is further reduced to form a stem 9, having a diameter to engage the chuck of a conventional hand drill.

The shaft 6 extends above the upper bushing 7 and is reduced in diameter to form a stem or arbor 10 that is fixedly engaged into a tubular sleeve 11, by pins 12 whereby to hold the shaft against rotation with respect to the sleeve. The sleeve 11 is formed centrally and axially of a collar 13. The collar 13 is axially drilled at 14 to receive and support a pilot drill 15. The opening for the drill 15 also communicates with the opening for the arbor 10. The collar 13 is provided with an upstanding concentric boss 16, that is externally threaded to receive a threaded concentric sleeve 17, formed upon the base portion 18 of a cup-shaped rotary saw 19. The saw 19 is provided with the usual annular row of cutting teeth 20. The base 18 of the saw is locked against rotative movement with respect to the boss 16 by screws 21, passing through threaded openings 22 formed in the sleeve at diametrically opposite points and with the screws having head portions 23 that are countersunk into recesses 24 formed in the collar 13. At a 90 degree angle, the collar 13 is drilled and threaded to receive a set screw 25 whereby to hold the drill 15 against turning and accidental displacement. The drill 15 projects a substantial distance above the cutting edge of the saw, as clearly shown.

In the use of the device, as before indicated, the housing 5 is disposed closely adjacent the wall of the building and the drill 15 engaged with the boards forming the eaves. The housing is then properly positioned as to vertical alignment and by holding the housing with one hand, the operator can then rotate the shaft after the hand drill has been attached, causing the drill 15 to act as a pilot for boring the initial hole and as it passes upwardly, is engaged by the saw teeth 20. The saw is adapted to have a diameter corresponding to a particular size of conduit to subsequently engage the holes. As the saw passes upwardly, the drill will then enter the roof structure and maintains the saw against shifting during the passage between the eaves and the roof and as the drilling continues, the saw will pass through the sheathing of the roof and the covering of the roof, forming an accurate hole through the roof structure from the eaves to the covering of the roof and greatly simplifies the hole through the roof which has been heretofore difficult to properly align the hole of the eaves and the roof.

It would be apparent from the foregoing that a very simple and desirable mechanism has been employed to quickly and easily form the holes in the eaves and the roof structure with a minimum of effort. The structure is simple, is strong, durable, cheap to manufacture and highly effective for the purposes indicated.

It is to be understood that the invention is not limited to the precise construction shown, but that changes are contemplated as readily fall within the spirit of the invention as shall be determined by the scope of the subjoined claim.

Having described my invention what I claim as new and desire to secure by Letters Patent is:

A boring tool of the character described for boring openings upwardly through an overhanging roof structure that comprises an elongated cylindrical housing open at its opposite ends, non-metallic bearing means disposed within the opposite ends of the housing, a shaft extending through the bearings and projecting beyond the upper and lower ends of the housing, the shaft having a constant diameter throughout the housing, the lower projecting ends of the shaft being reduced to form a connection to the chuck of an electric drill, a removable stop collar fixed upon the lower projecting end of the shaft to form a stop against the movement of the shaft with respect to the lower bearing, the upper extended end of the shaft being reduced in diameter to form a stem portion that engages into a socket formed by a cylindrical sleeve and with the reduced end of the shaft being connected to the sleeve against turning, an enlarged cylindrical collar carried by the sleeve that is integral with the sleeve and concentric to the shaft, an axially arranged upstanding threaded boss carried by the collar upon its top, a cup-shaped cylindrical saw adapted to rest upon the upper surface of the collar, the saw being provided with an upstanding internally threaded sleeve portion that has threaded engagement with the boss, the collar being provided at two diametrically opposite points with threaded openings that receive locking screws, the base of the saw being apertured to receive the ends of the screws to lock the collar with respect to the saw, the apertures of the collar being recessed and enlarged whereby the heads of the screws will seat therein, the saw having an upper circumferential row of cutting teeth, the boss and the collar being cylindrically apertured axially to receive the tail portion of a pilot drill, the pilot drill extending above the cutting teeth of the saw, a set screw threaded through an opening of the collar laterally thereof to engage the tail portion of the drill to prevent rotation of the drill with respect to the collar.

References Cited in the file of this patent

UNITED STATES PATENTS

| | | |
|---|---|---|
| 1,341,067 | Naugle | May 25, 1920 |
| 2,721,592 | Baker | Oct. 25, 1955 |
| 3,018,146 | Euwe et al. | Jan. 23, 1962 |